United States Patent
Diehl et al.

(10) Patent No.: US 7,805,607 B2
(45) Date of Patent: Sep. 28, 2010

(54) METHOD FOR THE ANONYMOUS AUTHENTICATION OF A DATA TRANSMITTER

(75) Inventors: Eric Diehl, Liffre (FR); Jean-Pierre Andreaux, Rennes (FR); Alain Durand, Rennes (FR)

(73) Assignee: Thomson Licensing, Boulogne-Billancourt (FR)

( * ) Notice: Subject to any disclaimer, the term of this patent is extended or adjusted under 35 U.S.C. 154(b) by 989 days.

(21) Appl. No.: 10/510,606

(22) PCT Filed: Apr. 11, 2003

(86) PCT No.: PCT/FR03/01169

§ 371 (c)(1),
(2), (4) Date: May 19, 2005

(87) PCT Pub. No.: WO03/088612

PCT Pub. Date: Oct. 23, 2003

(65) Prior Publication Data

US 2005/0204132 A1    Sep. 15, 2005

(30) Foreign Application Priority Data

Apr. 12, 2002  (FR) .................................. 02 04840

(51) Int. Cl.
*H04L 9/32* (2006.01)
(52) U.S. Cl. .................. 713/168; 713/180; 713/155; 380/46
(58) Field of Classification Search ............... 713/181, 713/178, 180, 170, 168; 726/30; 380/210, 380/205, 236, 46
See application file for complete search history.

(56) References Cited

U.S. PATENT DOCUMENTS 5,420,926 A * 5/1995 Low et al. ................... 705/74

(Continued)

FOREIGN PATENT DOCUMENTS

EP       1195734 B1    7/2001

(Continued)

OTHER PUBLICATIONS

Menezes et al. "Handbook of applied cryptography" Handbook of Applied Cryptography, CRC Press Series on Discret Mathematics and Its Applications and Its Applications, US 1997, pp. 400-405.*

(Continued)

*Primary Examiner*—Eleni A Shiferaw
(74) *Attorney, Agent, or Firm*—Robert D. Shedd; Joseph J. Opalach; Jerome G. Schaefer

(57) ABSTRACT

The invention relates to a method to verify that data received by a receiver has been sent by a transmitter authorized by a trusted third party, the transmitter and the receiver being connected to a digital network. An identifier is associated with the data sent by the transmitter and, on receipt of the data by the receiver, the receiver generates a random number and diffuses the same on the network. The transmitter that receives the random number calculates a response by applying a first function to the random number and to the identifier, and sends the response to the receiver which verifies the response received by applying a second function to the response received, the random number and the identifier. The first function is delivered first to the transmitter by the trusted third party. The second function is a function for checking the result of the first function which is delivered first to the receiver by the trusted third party.

12 Claims, 2 Drawing Sheets

U.S. PATENT DOCUMENTS

| | | | | | |
|---|---|---|---|---|---|
| 5,491,749 | A | * | 2/1996 | Rogaway | 713/171 |
| 5,491,750 | A | * | 2/1996 | Bellare et al. | 713/155 |
| 5,521,980 | A | * | 5/1996 | Brands | 380/30 |
| 5,668,876 | A | * | 9/1997 | Falk et al. | 380/271 |
| 5,802,457 | A | * | 9/1998 | Heiskari et al. | 455/88 |
| 5,815,665 | A | * | 9/1998 | Teper et al. | 709/229 |
| 5,832,089 | A | * | 11/1998 | Kravitz et al. | 705/69 |
| 5,884,272 | A | * | 3/1999 | Walker et al. | 705/1 |
| 6,256,664 | B1 | * | 7/2001 | Donoho et al. | 709/204 |
| 6,298,153 | B1 | * | 10/2001 | Oishi | 382/186 |
| 6,299,062 | B1 | * | 10/2001 | Hwang | 235/379 |
| 6,438,691 | B1 | * | 8/2002 | Mao | 713/176 |
| 6,446,052 | B1 | * | 9/2002 | Juels | 705/69 |
| 6,611,913 | B1 | * | 8/2003 | Carroll et al. | 713/171 |
| 6,681,328 | B1 | * | 1/2004 | Harris et al. | 713/175 |
| 6,763,112 | B1 | * | 7/2004 | Haumont | 380/247 |
| 6,789,192 | B2 | * | 9/2004 | Hirota et al. | 713/172 |
| 6,868,406 | B1 | * | 3/2005 | Ogg et al. | 705/60 |
| 6,947,725 | B2 | * | 9/2005 | Aura | 455/410 |
| 6,950,948 | B2 | * | 9/2005 | Neff | 705/12 |
| 6,957,199 | B1 | * | 10/2005 | Fisher | 705/78 |
| 7,234,059 | B1 | * | 6/2007 | Beaver et al. | 713/170 |
| 7,373,506 | B2 | * | 5/2008 | Asano et al. | 713/168 |
| 2004/0064714 | A1 | * | 4/2004 | Carr | 713/193 |

FOREIGN PATENT DOCUMENTS

JP    2001-211152    *  8/2001

OTHER PUBLICATIONS

Menezes et al: "Handbook of applied cryptography" Handbook of Applied Cryptography, CRC Press Series on Discrete Mathematices and Its Applications, US, 1997, pp. 400-405.

S. Schechter et al: "Anonymous Authentication of Membership in Dynamic Groups" Financial Cryptography, Int'l Conference, Feb. 22, 1999, pp. 184-195.

Kouya Tochikubo, Renewable Authentication and Encryption Systems, IPSJ Journal, vol. 41, Issue 8,Japan Partial Translation Of Renewal Authentication and Encryption Systems, Aug. 2000.

Translation of an Office Action of Japan Patent Office for Patent Application No. 2003-585394 Drafting date Aug. 21, 2009.

* cited by examiner

METHOD FOR THE ANONYMOUS AUTHENTICATION OF A DATA TRANSMITTER

This application claims the benefit, under 35 U.S.C. §365 of International Application PCT/FR03/01169, filed Apr. 11, 2003, which was published in accordance with PCT Article 21(2) on Oct. 23, 2003 in French and which claims the benefit of French patent application No. 0204840, filed Apr. 12, 2002.

FIELD OF THE INVENTION

The present invention relates to the secure exchange of data over a network linking various devices and to the authentication of the source of data sent over a network.

STATE OF THE ART

In certain cases, it is necessary for a data receiver device to be sure that the transmitter that has transmitted the data was indeed authorized to do so by a trusted third party without the receiver of the data knowing the identity of the transmitter, the data also being likely to be relayed by an intermediate device. All known schemes of authenticating a data transmitter imply that the receiver of the data knows the transmitter.

SUMMARY OF THE INVENTION

One aim of the invention is therefore to propose a method by which a transmitter of data can prove that it was indeed authorized to transmit the data by a trusted third party without the receiver of the data knowing the identity of the transmitter.

Accordingly, the invention concerns a method for verifying that data received by a receiver have been sent by a transmitter authorized by a trusted third party, the transmitter and the receiver being connected to a digital network. According to the invention, an identifier is associated with the data sent by the transmitter and the method comprises the steps consisting, for the receiver, in:
 (a) generating a random number;
 (b) broadcasting said random number over the network;
 (c) receiving from the transmitter a response computed by applying a first function to said random number and to said identifier; and
 (d) verifying the received response by applying a second function to the received response, to said random number and to said identifier;
 the first function having previously been delivered to the transmitter by the trusted third party and the second function being a function for verifying the result of the first function, previously delivered by the trusted third party to the receiver.

The transmitter may be either the initial transmitter of the data in the network, or an intermediate device between the initial transmitter and the receiver of the data which has for example stored the data transmitted by the initial transmitter.

According to a variant of the invention, the step (b) is replaced by a step consisting in sending the random number to the transmitter.

According to an embodiment of the invention, the receiver inhibits access to the data if the response received in the step (c) is not correct or if no response is received after the expiry of a predetermined time starting from the transmission of the random number.

The identifier associated with the data sent by the transmitter is preferably a random number generated by the initial transmitter of the data in the network and attached to these data by the initial transmitter. Naturally, this identifier gives no information on the identity of the transmitter.

The invention also relates to a method for proving that data sent to a receiver have been transmitted by a transmitter authorized by a trusted third party, the transmitter and the receiver being connected to a digital network. According to this aspect of the invention, an identifier is associated with the data sent by the transmitter and the method comprises the steps consisting, for the transmitter, in:
 (a) receiving a random number from the receiver;
 (b) computing a response by applying a first function to said random number and to said identifier;
 (c) sending the response to the receiver.

The response is likely to be verified by the receiver by applying a second function to the received response, to said random number and to said identifier; the first function having previously been delivered to the transmitter by the trusted third party and the second function being a function for verifying the result of the first function, previously delivered by the trusted third party to the receiver.

According to the principle of the invention, a trusted third party delivers to all the devices likely to be initial or intermediate transmitters in a network, the first function used to compute the response in the context of the above method. The trusted third party also delivers to all the devices likely to be receivers in the network, the second function for verifying the response computed with the aid of the first function.

BRIEF DESCRIPTION OF THE DRAWINGS

The invention will be better understood on reading the description that follows, given only as an example and made with reference to the appended drawings in which.

DETAILED DESCRIPTION OF THE EMBODIMENTS OF THE INVENTION

Figure 1:
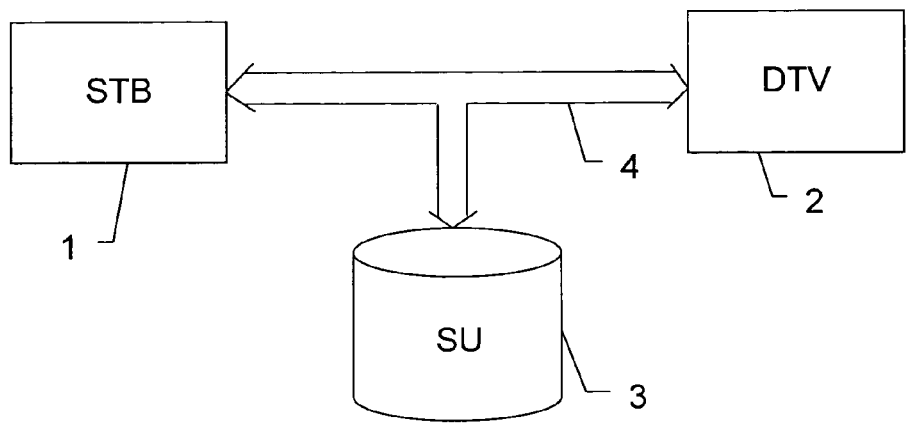
FIG. 1 represents a domestic digital network in which the invention is embodied.

On the basis of the principle of the invention explained above, several scenarios are possible.

According to a first scenario, a first transmitter, that will be called Alice, and a second transmitter, that will be called Charlie, transmit messages respectively called $M_A$ and $M_C$ over a network to which a receiver, that will be called Bob is connected. With the message $M_A$ Alice transmits an identifier $IdEvent_A$ which identifies the message $M_A$ and with the message $M_C$ Charlie transmits an identifier $IdEvent_C$ which identifies the message $M_C$.

Alice and Charlie who are both connected to the network receive respectively the messages $M_C$ and $M_A$ transmitted by the other transmitter of the network, but they do not retain them. Bob also receives the two messages and it is assumed that he wants to retain only the message $M_A$. To be sure that $M_A$ comes from a source authorized by a trusted third party, Bob launches a challenge/response protocol in the following manner. Bob generates a random number C (the challenge) then broadcasts it over the network. Alice and Charlie both receive the challenge C.

Prior to this, it is assumed that the trusted third party has delivered to Alice and Charlie a response computation function G and has delivered to Bob a corresponding response verification function H such that this function H returns 0 if the response is incorrect and 1 if the response is correct.

When Alice and Charlie receive the challenge C transmitted by Bob, they compute respectively responses $R_A$ and $R_C$ as follows:

Alice: $R_A = G(\text{IdEvent}_A, C)$;
Charlie: $R_C = G(\text{IdEvent}_C, C)$;

then they send respectively the responses $R_A$ and $R_C$ to Bob.

Bob then verifies each response by computing $H(C, R_X, \text{IdEvent}_X)$ where $X = A$ and $C$. If all the results returned by the function H are zero, then Bob does not retain the message $M_A$ which is considered as not originating from a safe source. On the other hand, if at least one result returned by H equals 1 (in the example, it will be $H(C, R_A, \text{IdEvent}_A)$), then Bob accepts the message $M_A$ because he is sure that it originates from a transmitter authorized by the trusted third party.

According to a second scenario, a transmitter, Alice, broadcasts a message $M_A$ accompanied by an identifier $\text{IdEvent}_A$ over a network to which a receiver Bob and an intermediate entity, that will be called Deborah, are connected. Initially, it is supposed that Bob is not interested in the message $M_A$ and that he does not retain it. Deborah however stores the message $M_A$ and its identifier $\text{IdEvent}_A$.

Later, when Alice is no longer broadcasting any message, it is supposed that Deborah broadcasts the stored message $M_A$ and its identifier $\text{IdEvent}_A$ over the network. Alice, being a transmitter only, does not retain $M_A$. Bob receives $M_A$ and wants to retain it. To ensure that it originates from a source authorized by a trusted third party, Bob launches a challenge/response protocol in the following manner. Bob generates a random number C (the challenge) then broadcasts it over the network.

Previously, it is supposed that the trusted third party has delivered to Alice and Deborah a response computation function G and has delivered to Bob a corresponding response verification function H such that this function H returns 0 if the response is incorrect and 1 if the response is correct.

Alice and Deborah receive the challenge C. Since Alice is not transmitting a message, she does not take account of the challenge C. Deborah however computes a response $R_D = G(\text{IdEvent}_A, C)$ and sends this response to Bob. Bob then verifies this response by computing $H(C, R_D, \text{IdEvent}_A)$. If the function H returns 0, then Bob does not retain the message $M_A$. On the other hand, if the function H returns 1, then Bob accepts the message $M_A$ which is considered as originating from an authorized source.

It will be noted that in the two scenarios described above, the receiver entity Bob, even though he is capable of responding to the source of the message, does not know whether the message he receives originates from a transmitter (such as Alice) or from an intermediate device (such as Deborah) and above all he does not know the identity of the transmitter of the message $M_A$.

A description will now be given of a more concrete examplary embodiment of the invention with reference to FIG. 1 in which an STB (Set Top Box) decoder 1, a DTV (Digital Television) receiver 2 and an SU (Storage Unit) 3 are represented.

It is supposed that the data broadcast over this network represent audiovisual programs comprising Audio and Video bit streams transported in a data transport stream as defined in the standard ISO/IEC 13818-1 "Information technology—Generic coding of moving pictures and associated audio information: Systems".

The decoder 1 represents a transmitter of data over the network; it transmits data that it receives for example from a satellite antenna or from a cable connection. The digital television 2 represents a receiver of data over the network. The storage unit 3 for its part represents an intermediate device capable of retransmitting over the network data received from another transmitter device of the network.

These three devices are connected to a digital bus 4, for example a bus according to the IEEE 1394 standard, and thus form a digital home network. The messages transmitted over the network are sent via the isochronous channel of the bus 4 and the messages that are addressed are sent via the asynchronous channel of the bus 4.

The trusted third party which delivers a function G for computing a response to a challenge/response protocol to the transmitter or intermediate devices of the network (in our example, the decoder 1 and the storage unit 3) and which delivers a response verification function H to the receiver devices of the network (in our example the digital television 2) is for example the manufacturer of the devices.

As concerns the choice of the functions G and H, three embodiments will be envisaged.

According to a first preferred embodiment, the function G is a public function that uses a secret key K in order to compute a response R based on a challenge C and on an identifier IdEvent (i.e. $R = G_K(C, \text{IdEvent})$). To guarantee that the transmitter or intermediate devices are compliant devices, authorized by the trusted third party, the secret K is inserted into these devices, in a secure storage zone that must not be subsequently accessible (for example in a secure processor, particularly included in a smart card).

The function H is in this case a function that computes a response R' based on the challenge C and on the identifier IdEvent by applying the function G with the secret key K and which then compares the result R' with the received response R. H is a boolean function which delivers a zero value "0" if R' is different from R and which delivers a "1" value if R' equals R. In this case, the secret key K must also be previously inserted by the trusted third party into the receiver devices.

A function G corresponding to the above definition may in particular be an encryption function such as the AES function described in particular in "FIPS 197: Specification of the Advanced Encryption Standard (AES)—26 Nov. 2001". It may also be a hashing function such as the HMAC-SHA1 function described in particular in "FIPS Publication 198: The Keyed-Hash Message Authentication Code (HMAC), National Institute of Standards and Technology, 2001".

In a second embodiment, the function G is a secret function that is inserted into the transmitter or intermediate devices considered to be compliant and authorized by the trusted third party. Preferably, this function must be chosen in order to be very difficult to find by analyzing the products that contain it. In addition, this function must be resistant to adaptive chosen-plaintext attacks.

As in the first embodiment, the function H is in this case a boolean function which computes a response R' based on the challenge C and on the identifier IdEvent by applying the secret function G and which then compares the result R' with the received response R, delivering a zero value "0" if R' is different from R and delivering a "1" value if R' equals R. In this embodiment, the secret function G must therefore also be previously inserted by the trusted third party into the receiver devices.

In a third embodiment, the functions G and H are public functions using a pair of asymmetric keys (private key/public key). The function G is for example a function for generating a signature with the aid of a private key and the function H is a function for verifying a signature with the aid of the corresponding public key.

For example the RSA (Rivest, Shamir and Adleman) signature functions will be used as follows:

R=G(C, IdEvent)=RSASign$_{KPRI}$(C, IdEvent) and

H(C, R, IdEvent)=RSAVerif$_{KPUB}$(C, R, IdEvent); where KPRI and KPUB are the private key and the public key of one and the same pair of RSA keys.

In this case, the private key is inserted into the transmitter or intermediate devices of the network by the trusted third party and the public key is inserted into the receiver devices of the network.

It will be assumed in what follows that the first embodiment has been chosen in which the function G is the HMAC-SHA1 function and that a secret key K is included in an inviolable storage zone of the decoder STB 1, of the digital television receiver DTV 2 and of the storage unit SU 3.

First Scenario: the STB Transmits a Program Directly to the DTV

Figure 2:
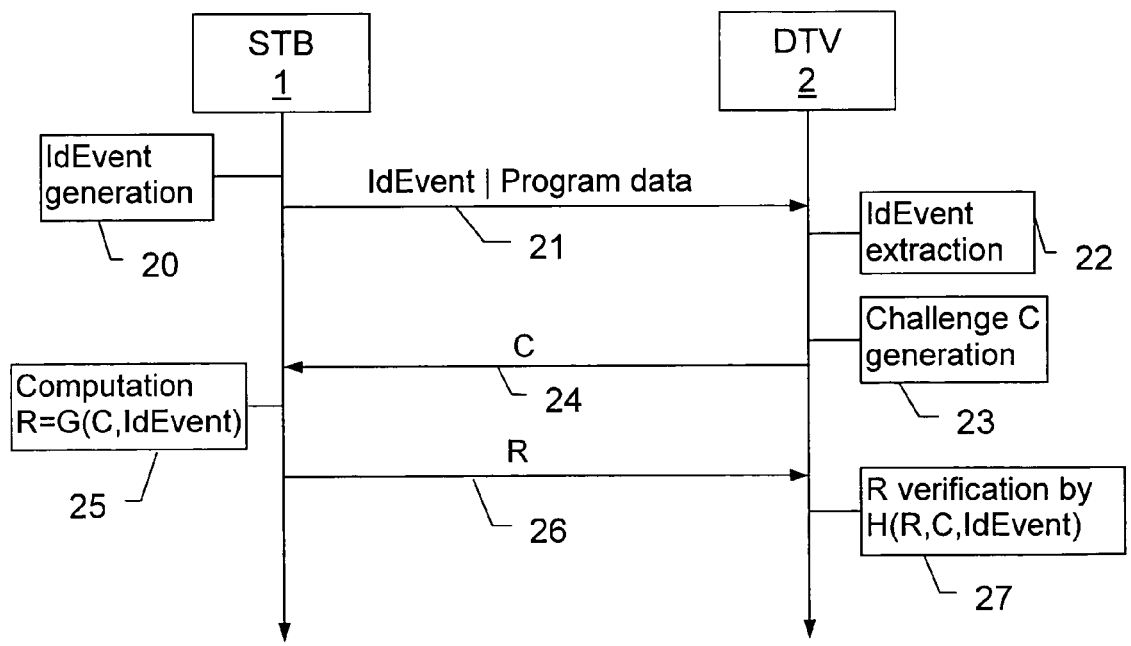
FIGS. 2 and 3 illustrate two exemplary embodiments of the invention.

As illustrated in FIG. 2, when the user of the decoder STB 1 selects a new program so that it is broadcast in the network, the STB randomly generates a program identifier IdEvent (step 20), which is preferably a number of 128 bits and it inserts this identifier into the messages contained in the packets transporting the data representing the program. The data transport stream is then broadcast over the network (on the isochronous channel of the bus 4) during the step 21. It is received by the digital television DTV 2 which extracts the messages containing the identifier from the received data packets in order finally to retrieve this identifier IdEvent (step 22).

The DTV then generates in step 23 a challenge C which is preferably a random number of 128 bits, and it broadcasts this challenge C over the network during the step 24. When the STB receives the challenge C, it computes the response in the step 25:

R=G(C, IdEvent), or more precisely:

R$_{STB}$=HMAC-SHA1$_K$(C, IdEvent)

and addresses this response to the DTV via the asynchronous channel of the bus 4 (step 26).

The storage unit SU 3, which also receives the challenge C does not respond since it is not in the process of transmitting data.

When the DTV receives the response R=R$_{STB}$ from the STB, it applies the function H (R, C, IdEvent) to verify the response R (step 27) which means computing:

R$_{DTV}$=HMAC-SHA1$_K$(C, IdEvent) and comparing this result with the received response R$_{STB}$. If the two values are the same, then the DTV considers that the received program originates from a transmitter authorized by the trusted third party and can be presented to the user. Otherwise, the DTV does not display the received program to the user. If the DTV receives no response after a predetermined time has elapsed since the challenge C was sent over the network, it also blocks the display of the received program.

At the end of the protocol, the challenge C and the identifier IdEvent are erased from the memories of the STB and the DTV.

Second Scenario: the STB Transmits a Program that is Stored by the SU which Subsequently Transmits it to the DTV.

Figure 3:
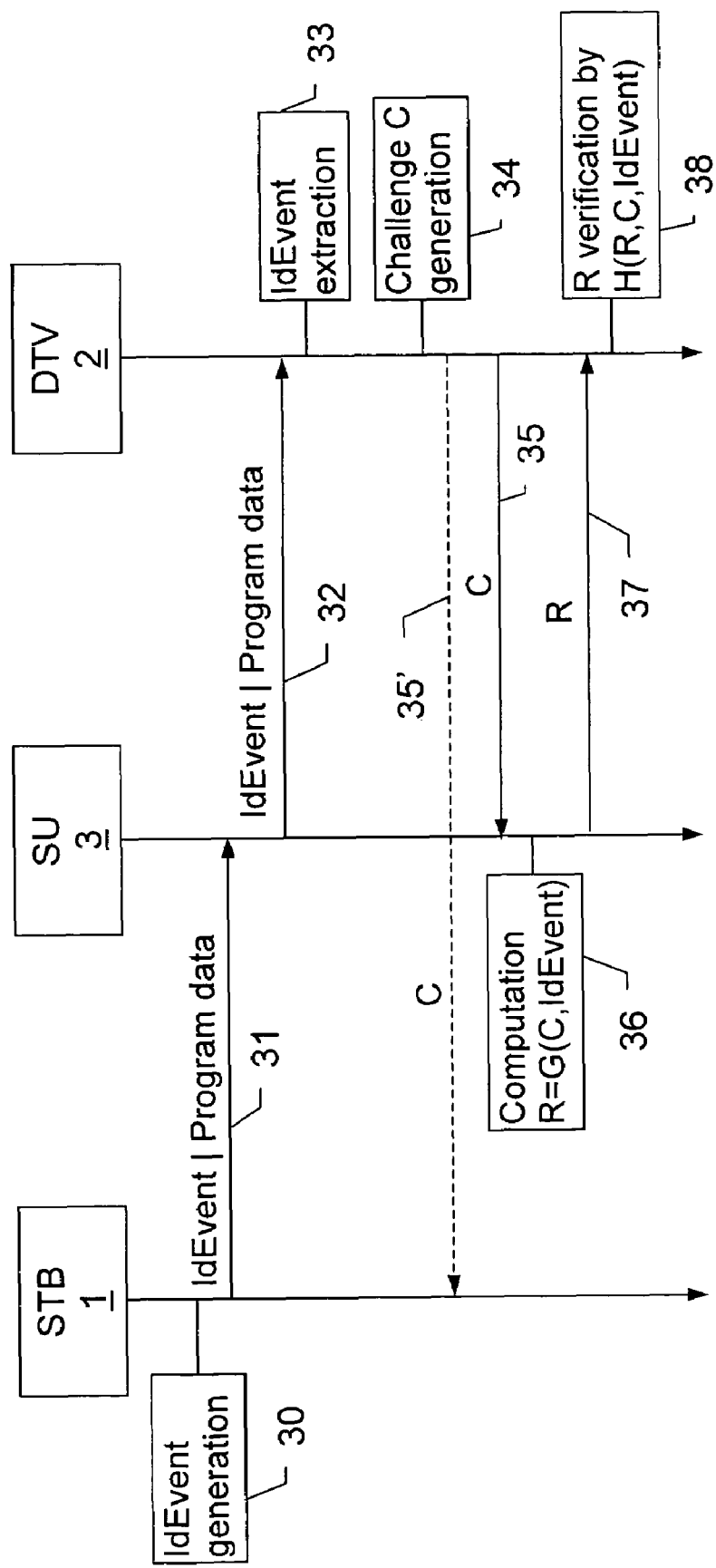

This scenario is illustrated by FIG. 3.

Initially, it is assumed that the user of the STB selects a new program. The STB then generates an identifier IdEvent (step 30) as in the first scenario above and it inserts this identifier into messages included in the data transport packets representing the program before broadcasting the data transport stream over the network (step 31).

The SU then stores the data stream representing the program. The user has for example chosen not to view immediately the program that is broadcast by the decoder and prefers to store it in order to play it back later.

Secondly, the user wants to play back the stored program. The SU therefore broadcasts the program over the network during a step 32. The DTV receives the data packets and extracts from them the messages containing the identifier IdEvent in step 33.

The DTV then generates a challenge C as in the first scenario (step 34) and it broadcasts this challenge over the network (steps 35, 35').

The SU receives this challenge C, so it computes the response in step 36:

R=G(C, IdEvent), or more precisely:

R$_{SU}$=HMAC-SHA1$_K$(C, IdEvent)

and addresses this response to the DTV via the asynchronous channel of the bus 4 (step 37).

The STB which is not in the process of broadcasting data does not respond to the challenge C which it also receives.

When the DTV receives the response R=R$_{SU}$ from the SU, it applies the function H (R, C, IdEvent) to verify the response R (step 38) which involves computing:

R$_{DTV}$=HMAC-SHA1$_K$(C, IdEvent) and comparing this result with the received response Rsu. If the two values are the same, then the DTV considers that the received program originates from a transmitter authorized by the trusted third party and can be presented to the user. In the contrary case, or when no response has been received after a predetermined time after the challenge C was sent by the DTV, the latter does not display the received program to the user.

It will be noted that when the STB has finished transmitting the program initially, it then erases the identifier IdEvent from its memory.

At the end of the protocol, the challenge C and the identifier IdEvent are also erased from the memories of the SU and the DTV.

In a variant embodiment of the invention, particularly in the two scenarii explained above, it is possible to replace the step of broadcasting over the network the challenge C computed by the DTV with a step of sending this challenge C to the transmitter of the data (the STB in the first scenario or the SU in the second scenario). In this case, only the transmitter of the data receives the challenge C. Specifically, the existing digital network management protocols allow a receiver of data to respond to the source of the data without knowing its identity.

In another variant embodiment, the receiver of the data broadcasts over the network, in addition to the challenge C, the identifier IdEvent associated with the data that it has received (for example in step 24 in FIG. 2, or in step 35, 35' in FIG. 3). Each transmitting network appliance that receives the challenge C and the identifier IdEvent verifies whether it should respond to this challenge by comparing the received identifier IdEvent with that which it may just have generated in order to broadcast data. The transmitter responds only if the identifier received with the challenge corresponds to its current identifier IdEvent. This prevents all the transmitters that are broadcasting data in the network from responding when a challenge C is sent by a receiver.

The invention has the following advantages in particular:

Even if several transmitter or intermediate devices are connected to the network, only that which has been authorized by the trusted third party and which has sent the data is capable of responding to the challenge/response protocol initiated by the receiver of the data.

The protocol does not divulge any information concerning the transmitter to the receiver. This achieves the objective of an anonymous authentication of the transmitter device.

The protocol is based only on the application layer and requires no special feature on the data transport layer.

The invention claimed is:

1. A method for verifying that data received by a receiver apparatus have been sent by a transmitter authorized by a trusted third party to transmit the data, the transmitter and the receiver apparatus being connected to a digital network, the method performed by the receiver apparatus comprising:
   (a) receiving, at the receiver apparatus, the data and an identifier for the data;
   (b) generating a random number;
   (c) broadcasting said random number and said identifier over the network;
   (d) receiving from the transmitter a response computed by applying a first function to said random number and to said identifier;
   (e) verifying the received response by applying a second function to the received response, to said random number and to said identifier;
   the first function having previously been delivered to the transmitter by the trusted third party and the second function being a function for verifying the result of the first function, previously delivered by the trusted third party to the receiver apparatus;
   wherein the receiver apparatus does not know the identity of the transmitter; and
   wherein the transmitter is a set top box and the receiver apparatus is a digital television.

2. The method as claimed in claim 1, in which the step (c) is replaced by a step comprising sending said random number to the transmitter.

3. The method as claimed in claim 1, wherein the receiver apparatus inhibits access to said data if the response received in the step (d) is not correct or if no response is received after the expiry of a predetermined time starting from the transmission of the random number.

4. The method as claimed in claim 1, wherein the identifier associated with the data sent by the transmitter apparatus is a random number generated by the initial transmitter of the data in the network and attached to said data by the initial transmitter.

5. The method as claimed in claim 1, wherein the first function is a public function using a secret key.

6. The method as claimed in claim 5, wherein the second function is a boolean function and further comprising:
   computing an expected response by applying to said random number and to said identifier the first function with the secret key and
   comparing the expected response with the response received in order to deliver:
   a "0" value if the expected and received responses are different and
   a "1" value if the expected and received responses are equal.

7. The method as claimed in claim 1, wherein the first function is a secret function.

8. The method as claimed in claim 7, wherein the second function is a boolean function and further comprising:
   computing an expected response by applying the first function to said random number and to said identifier and
   comparing the expected response with the received response in order to deliver:
   a "0" value if the expected and received responses are different and
   a "1" value if the expected and received responses are equal.

9. The method as claimed in claim 1, wherein the first function is a public function for signature generation with the aid of a private key.

10. The method as claimed in claim 9, wherein the second function is a public function for signature verification with the aid of a public key corresponding to the private key used by the first function.

11. A method for proving that data sent to a receiver have been transmitted by a transmitter apparatus authorized by a trusted third party to transmit the data, the transmitter apparatus and the receiver being connected to a digital network, wherein an identifier is associated with the data sent by the transmitter apparatus, the method for the transmitter apparatus comprising:
   (a) sending, from the transmitter apparatus, the data and the identifier for the data to the receiver that does not know the identity of the transmitter apparatus;
   (b) receiving a random number from the receiver;
   (c) computing a response by applying a first function to said random number and to said identifier;
   (d) sending said response to the receiver;
   said response being verified by the receiver by applying a second function to the received response, to said random number and to said identifier;
   the first function having previously been delivered to the transmitter apparatus by the trusted third party and the second function being a function for verifying the result of the first function, previously delivered by the trusted third party to the receiver; and
   wherein the transmitter apparatus is a set top box and the receiver is a digital television.

12. The method as claimed in claim 11, in which the transmitter apparatus also receives in step (b) the identifier associated with the data and in which the steps (c) and (d) are not carried out unless said identifier received in the step (b) corresponds to the identifier associated with the data that the transmitter apparatus has just sent.

* * * * *